(12) United States Patent  (10) Patent No.: US 7,506,374 B2
Carmona  (45) Date of Patent: Mar. 17, 2009

(54) MEMORY SCANNING SYSTEM AND METHOD

(75) Inventor: Itshak Carmona, Petach-Tikva (IL)

(73) Assignee: Computer Associates Think, Inc., Islandia, NY (US)

(*) Notice: Subject to any disclaimer, the term of this patent is extended or adjusted under 35 U.S.C. 154(b) by 817 days.

(21) Appl. No.: 10/615,053

(22) Filed: Jul. 7, 2003

(65) Prior Publication Data
US 2005/0055558 A1  Mar. 10, 2005

Related U.S. Application Data

(63) Continuation of application No. 10/285,102, filed on Oct. 31, 2002, now abandoned.

(60) Provisional application No. 60/335,648, filed on Oct. 31, 2001.

(51) Int. Cl.
G06F 21/00 (2006.01)
G06F 11/30 (2006.01)
G06F 9/00 (2006.01)

(52) U.S. Cl. ...................................................... 726/24

(58) Field of Classification Search .................. None
See application file for complete search history.

(56) References Cited

U.S. PATENT DOCUMENTS

| | | | |
|---|---|---|---|
| 5,623,600 A * | 4/1997 | Ji et al. | 726/24 |
| 6,240,530 B1 * | 5/2001 | Togawa | 714/38 |
| 6,269,456 B1 * | 7/2001 | Hodges et al. | 714/38 |
| 6,401,210 B1 * | 6/2002 | Templeton | 726/24 |
| 6,957,348 B1 * | 10/2005 | Flowers et al. | 726/23 |
| 7,073,198 B1 * | 7/2006 | Flowers et al. | 726/25 |
| 7,080,250 B2 * | 7/2006 | Calvert | 713/168 |
| 7,162,742 B1 * | 1/2007 | Flowers et al. | 726/25 |
| 7,181,769 B1 * | 2/2007 | Keanini et al. | 726/23 |
| 7,228,426 B2 * | 6/2007 | Sinha et al. | 713/176 |
| 7,231,665 B1 * | 6/2007 | McArdle et al. | 726/22 |
| 7,290,283 B2 * | 10/2007 | Copeland, III | 726/25 |
| 7,340,775 B1 * | 3/2008 | Tarbotton et al. | 726/24 |
| 2002/0162015 A1 * | 10/2002 | Tang | 713/200 |
| 2004/0236960 A1 * | 11/2004 | Zimmer et al. | 713/200 |
| 2005/0086522 A1 * | 4/2005 | Rowland | 713/201 |
| 2006/0031673 A1 * | 2/2006 | Beck et al. | 713/164 |
| 2006/0107006 A1 * | 5/2006 | Green et al. | 711/162 |
| 2006/0253734 A1 * | 11/2006 | Oka | 714/6 |
| 2006/0272017 A1 * | 11/2006 | Largman et al. | 726/22 |
| 2006/0277433 A1 * | 12/2006 | Largman et al. | 714/15 |

FOREIGN PATENT DOCUMENTS

WO  WO 03/084181 A1 * 10/2003

* cited by examiner

Primary Examiner—Christopher A Revak
(74) Attorney, Agent, or Firm—Baker Botts L.L.P.

(57) ABSTRACT

A method and system for detecting and removing malicious code from a computer system. The method determines an operating system of the computer system, scans the computer system for malicious code based on the operating system and detects the malicious code. The method and system may also remove the malicious code from the computer system. The method may retrieve from a data file, information relating to the malicious code including at least one command for restoring the computer system to a state that existed prior to modification by the malicious code, and may execute the at least one command for restoring the computer system to substantially the same state as it existed prior to modification by the malicious code. The method scans predetermined memory locations based on the operating system.

36 Claims, 9 Drawing Sheets

FIG. 4

| Memory Location | Contents |
| --- | --- |
| 00000: | Interrupt Vector |
| 00400: | Bios Data |
| 00700: | DOS Area<br>DOS MCB's |
| 9FFFF: | DOS End |
| A0000: | Upper Memory |
| F0000: | Bios Code |
| FFFFF: | 1MB Limit<br>High Memory Start |
| 10000 + 64 KB | High Memory End<br>Extended Memory Start | ced
MEMORY SCANNING SYSTEM AND METHOD

CROSS-REFERENCE TO RELATED APPLICATIONS

This application is a continuation of U.S. patent application Ser. No. 10/285,102 (now abandoned), filed Oct. 31, 2002, entitled MEMORY SCANNING SYSTEM AND METHOD, which claims the benefit of co-pending provisional application Ser. No. 60/335,648, filed Oct. 31, 2001 and entitled "MEMORY SCANNING SYSTEM AND METHOD."

TECHNICAL FIELD

The present disclosure relates to detection and removal of computer programs. More specifically, the present disclosure relates to detecting a malicious computer program in computer systems and restoring computer systems damaged by the malicious computer program.

DESCRIPTION OF THE RELATED ART

Computer viruses are a major problem in modern day computing. For example, a computer virus may be a program (or some unit of code, e.g., instructions to which the computer responds, such as a code block, code element or code segment) that may attach to other programs and/or objects, may replicate itself, and/or may perform unsolicited or malicious actions on a computer system. To combat the computer virus problem, several virus scanning programs have been made available to scan the computer system for the presence of a computer virus. Although described herein as relating to computer viruses, the present disclosure may be applied to any type of malicious code capable of modifying one or more portions of a computer's resources.

Present virus scanning programs may scan all physical memory present on a computer system, regardless of current usage. For example, some virus scanning programs scan for unique signatures associated with viruses. A signature is a unique bit string that is common to each copy of a particular virus. Accordingly, the signature may be used by a virus scanning program to detect the presence of the virus. However, searching unused or not recently used memory portions may cause the virus scanning program to make false detections, because data stored in unused or not recently used memory portions may be mistaken for a signature of a virus.

In addition, because present virus scanning programs may scan only physical memory and may not scan virtual memory pages, where additional memory data is temporarily stored, the present virus scanning programs may not detect a virus located in a virtual memory page during scanning.

There are several popular operating systems employed on computer systems, for example, MS-DOS, Windows 3.X, which may include, for example, Windows 3.0, 3.1, 3.11, Windows for Workgroups 3.1, 3.11 and others, Windows 95, Windows 98, Windows NT, and Windows 2000, each employing a different memory format which may result in different unused memory portions. Therefore, there is a need for a virus detection and removal system which searches memory areas based on operating system.

SUMMARY

The present disclosure relates to a method for detecting and removing malicious code from a computer system, including determining an operating system of the computer system, scanning the computer system for malicious code based on the operating system and detecting the malicious code. The method may also include removing malicious code from the computer system. The method may further include retrieving from a data file, information relating to the malicious code including at least one command for restoring the computer system to a state that existed prior to modification by the malicious code, and executing the at least one command for restoring the computer system to substantially the same state as it existed prior to modification by the malicious code. The step of scanning may include scanning predetermined memory locations based on the operating system.

The present disclosure also relates to a storage medium including computer executable code for detecting and removing malicious code from a computer system, the storage medium includes code for determining an operating system of the computer system, code for scanning the computer system for malicious code based on the operating system and code for detecting the malicious code. The storage medium may include code for removing the malicious code from the computer system. The storage medium may also include code for retrieving from a data file, information relating to the malicious code including at least one command for restoring the computer system to a state that existed prior to modification by the malicious code, and code for executing the at least one command for restoring the computer system to substantially the same state as it existed prior to modification by the malicious code. The code for scanning may include code for scanning predetermined memory locations based on the operating system.

The present disclosure also relates to a computer data signal embodied in a transmission medium and including computer executable instructions for detecting and removing malicious code from a computer system, the computer data signal includes a data signal portion for determining an operating system of the computer system, a data signal portion for scanning the computer system for malicious code based on the operating system, a data signal portion for detecting the malicious code. The computer data signal may also include a data signal portion for removing the malicious code from the computer system. The computer data signal may also include a data signal portion for retrieving from a data file, information relating to the malicious code including at least one command for restoring the computer system to a state that existed prior to modification by the malicious code, and a data signal portion for executing the at least one command for restoring the computer system to substantially the same state as it existed prior to modification by the malicious code. The data signal portion for scanning may include a data signal portion for scanning predetermined memory locations based on the operating system.

The present disclosure additionally relates to a system for detecting and removing malicious code from a computer system including an identifying device adapted to identify the operating system of the computer system, a scanning device adapted to scan the computer system in accordance with the identified operating system and a code identifying device adapted to detect the malicious code. The system may also include a code removing device adapted to remove the malicious code from the computer system. The system may also include a retrieving device adapted to retrieve from a data file, information relating to the malicious code including at least one command for restoring the computer system to a state that existed prior to modification by the malicious code, and an executing device adapted to execute the at least one command for restoring the computer system to substantially the same state as it existed prior to modification by the malicious code. The scanning device may scan predetermined memory locations based on the operating system.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 shows a DOS memory layout with memory addresses and contents;

DETAILED DESCRIPTION

Figure 1:
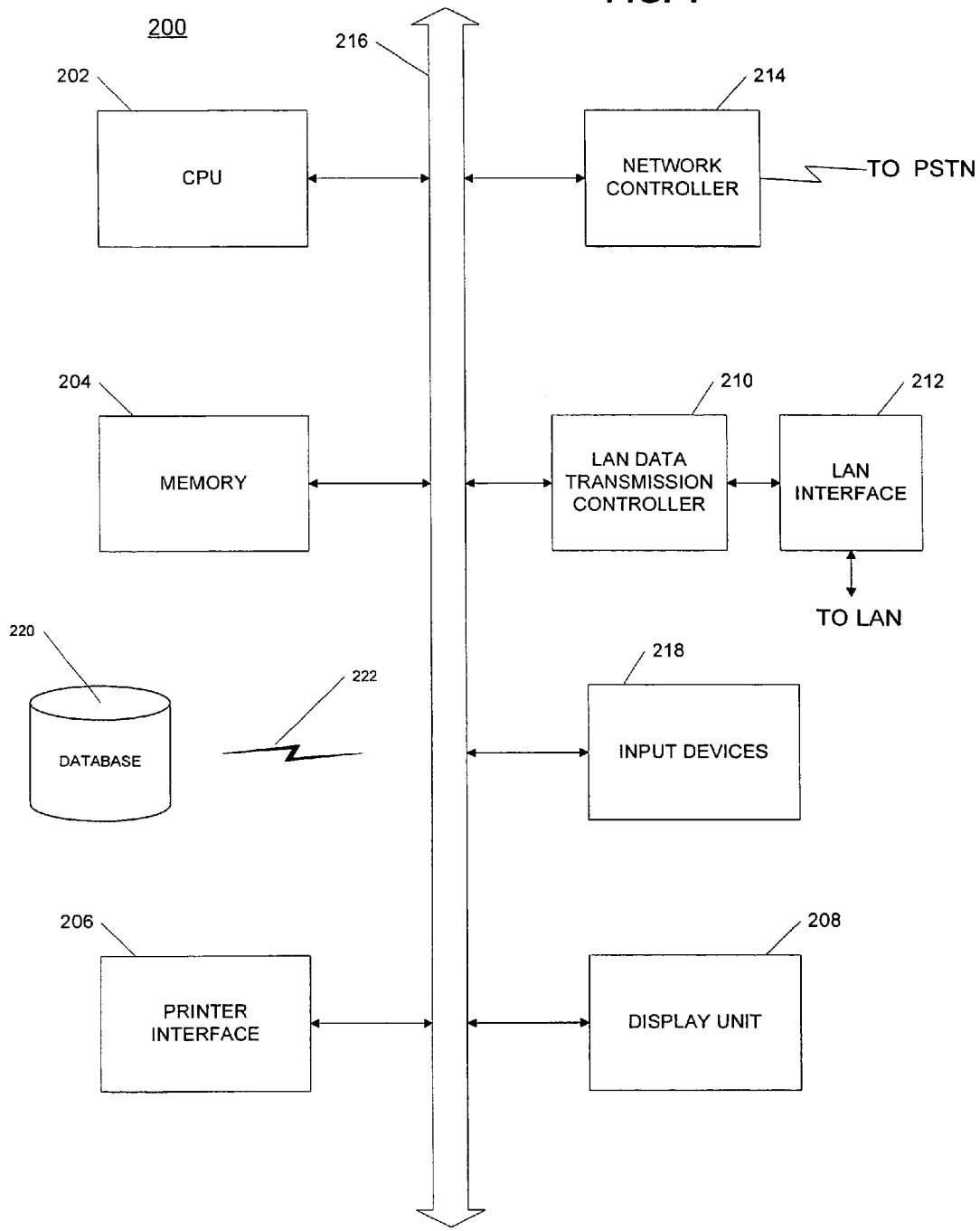
FIG. 1 shows an example of a computer system capable of implementing the method and system of the present disclosure.

In describing preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 shows an example of a computer system capable of implementing the method and system of the present disclosure. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

An example of a computer system capable of implementing the present method and system is shown in FIG. 1. The computer system referred to generally as system 200 may include a central processing unit (CPU) 202, memory 204, for example, Random Access Memory (RAM), a printer interface 206, a display unit 208, a (LAN) local area network data transmission controller 210, a LAN interface 212, a network controller 214, an internal bus 216 and one or more input devices 218, for example, a keyboard, mouse etc. As shown, the system 200 may be connected to a data storage device, for example, a hard disk, 200, via a link 222.

As noted above, various types of operating systems may be used on computer systems. Each type of operating system may use different memory formats. The memory formats may include physical memory blocks and/or virtual memory blocks or pages. The system and method of the present disclosure may perform an appropriate logical memory scan, for example, a scan of the physical memory blocks and virtual memory pages, depending on the operating system present on the computer scanned.

Figure 2:
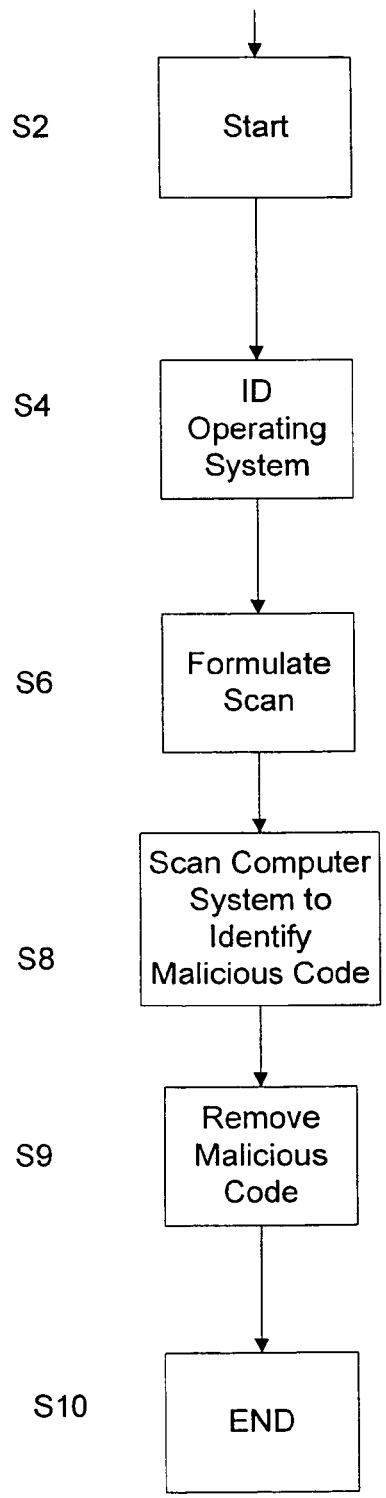
FIG. 2 shows an overall flow of a method according to an embodiment of the present disclosure for scanning memory.

FIG. 2 shows an overall flow of a method according to an embodiment of the present disclosure for scanning the computer system. In Step S2, scanning of memory of the computer system for malicious code begins. For example, the scanning may begin in response to a direct user request that a scan be performed or in response to a preset time for performing the scan (e.g., on an hourly, daily, weekly basis, etc.). In Step S4, the operating system running on the computer system to be scanned is determined. For example, the operating system may be input by a user in response to a prompt by the system performing the scan, or may be determined automatically. In Step S6, the memory scan is formulated based on the type of operating system used by the operating system as determined in Step S4. For example, the memory may be divided into sections based on the operating system.

Virus code may be detected by searching a computer system for one or more string patterns, known as a virus signature, which are unique bit string data sequences indicative of a particular virus. Virus detection may include the use of string matching procedures, analogous to the "Find" and "Spell Check" commands found in word processing programs to match data stored in the memory with known virus signatures. Virus signatures may be stored in a database that is located locally in the computer system or accessed remotely by the computer system and is updatable when a new virus is discovered.

In Step S8, the memory is scanned for malicious code, using the appropriate scan formulated for that particular type of operating system. For example, in a DOS environment, resident programs and interrupt hooks may be scanned. For a Windows environment, system and virtual memory as well as DOS memory may be scanned using a system similar or identical to the DOS environment. Applications and different objects' hooks (e.g., file systems, internal functions, etc.) may also be scanned. At step S9, the malicious code may be removed from the computer system. The method may end at step S10.

The present system and method also allows the memory scan to be optimized so that sections of a memory structure that may not be infected with malicious code for any reason, are not scanned. For example, it may be known that a particular operating system does not use a certain memory block or blocks under any circumstances. Accordingly, the memory scan for that operating system may not perform a scan for malicious code on that block(s) of memory.

Figure 3:
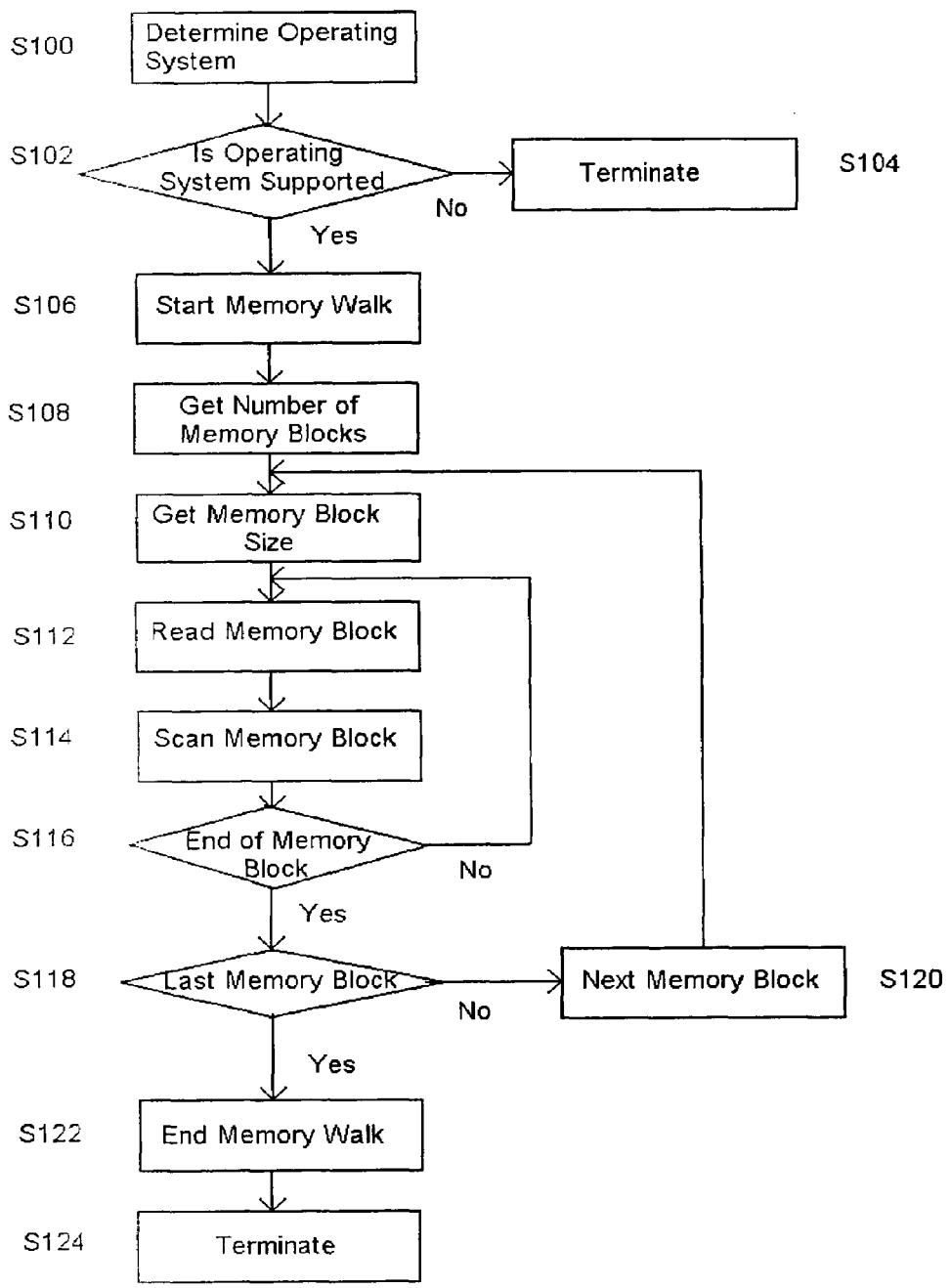
FIG. 3 shows a flowchart of a method for detecting and removing malicious code in operating systems according to an embodiment of the present disclosure.

FIG. 3 shows a more detailed flowchart of a process for scanning for malicious code according to an embodiment of the present disclosure. The process determines the type of operating system used by the computer system (Step S100). This may be performed in a manner similar to that described above with respect to FIG. 2. A determination is then made whether the determined operating system is supported by the malicious code scanning process. (Step S102). Supported operating systems may include, for example, MS-DOS, Windows 3.X, Windows 95, Windows 98, Windows NT, and Windows 2000, etc. While these operating systems are commonly used, the system and method of the present invention may be utilized with other operating systems. If the operating system is not supported (No, Step S102), an error code may be returned, and the process may terminate (Step S104).

If the operating system is supported (Yes, Step S102), the process begins a memory walk (Step S106) by issuing a command specific to the operating system. For example, depending on the operating system in use, computer memory, (e.g., RAM), may be divided into a number of blocks with each block having a size measured, for example, in bytes. In this example, the process determines the number of memory blocks (Step S108) and the size of each memory block (Step S110). The process reads at least a portion of a memory block by issuing a command specific to the operating system (Step S112) and then scans the portion of the memory block for malicious code (Step S114).

A determination is then made whether the end of the memory block has been reached (Step S116). If the process has not read and scanned the end of the memory block (No, Step S116), the process returns to Step S112 where it reads the next portion of the memory block. If the process has read and scanned the end of the memory block (Yes, Step S116), the process determines if this is the last memory block to be read and scanned (Step S118). If there are remaining memory blocks to be read and scanned (No, Step S118), the process selects the next memory block (Step S120), then returns to Step S110 to determine the size of the next memory block. If there are no remaining blocks (Yes, Step S118), the process ends the memory walk by issuing a command specific to the operating system (Step S122) and the process may terminate (Step S124).

For computers operating the MS-DOS (DOS) operating system, the system and method of the present disclosure may scan memory based on memory layout. FIG. 4 shows a DOS memory layout with memory addresses and contents.

For every region of memory, or block, that DOS allocates for itself or for other processes (free space, programs, device drivers, TSRs, and so on), it adds a 16-byte structure to the beginning of that block. DOS refers to this 16-byte structure as a Memory Control Block (MCB). Each MCB contains information that DOS uses to manage the available memory for the computer, such as information about the block and a link to the next MCB. Bytes 4 and 5 of each MCB contain an unsigned integer that specifies the size of that particular memory block in paragraphs (16-byte chunks). When a process requests a memory block allocation, DOS rearranges the chain of memory blocks, reserves a continuous block of requested size and marks the block as occupied by the process in question.

For the memory area up to 1 megabyte (Mbyte)+64 kilobyte (Kbyte), the system and method of the present disclosure may scan all physical memory, unused MCB's and BIOS/Hardware mapped regions. These areas may be scanned without scanning DOS buffers, if desired, to reduce scanning time. To locate the first MCB, the system of the present disclosure may perform a search for a MCB pattern.

For the "Extended Memory Area" beyond 1 megabyte (Mbyte)+64 kilobyte (Kbyte), the system and method of the present disclosure may scan all used physical memory and may omit scanning DOS buffers. The read memory block callback function may be altered to perform the walk through.

As noted above, the system and method of the present disclosure determines the operating system used by the computer being scanned and formulates the scan according to the operating system. Since different operating systems utilize different memory formats, the system and method of the present disclosure implements the scanning in different ways depending on the specific operating system being used. In some operating systems it may be unnecessary to scan certain sections of memory because the operating system does not utilize those sections. Other operating systems utilize physical memory locations as well as virtual memory pages, which should also be scanned for malicious code. Scanning implemented by the present system and method on a DOS operating system has been described above, further examples of specific operating systems and the sections of memory or virtual memory pages scanned utilizing the system and method of the present disclosure are discussed below.

For computers using the Windows 3.X operating system, the system and method of the present disclosure may scan the DOS platform memory locations except Extended Memory blocks allocated for the DOS Protected Mode Interface (DPMI), and SmartDrive memory blocks, which are data buffers providing a data cache in extended memory for storing data going to or coming from the hard disk.

Windows 3.X uses Himem.sys to allocate memory blocks and manage those blocks via DPMI. The system and method of the present disclosure preferably uses the DPMI interface to scan memory.

A callback function is a function defined by the application which the Windows API will call. Callback functions are usually used whenever a program processes certain information itself at some time in the midst of the execution of an API function.

Under Windows 3.X, the system and method of the present disclosure may be implemented in a manner similar to that described under DOS using Windows 3.X callback functions, with a device driver for low-level calls, such as, for example, interrupts and memory access.

Further, under Windows 3.X, the system and method of the present disclosure may locate and scan memory of DOS virtual machines (VM).

For computers using the Windows 9X operating system, the system and method of the present disclosure may scan the above described DOS platform memory locations using Windows 9X callback functions for each Virtual Machine including the System Virtual Machine. Memory blocks belonging to Windows processes may be scanned using a read memory block call back function.

Under Windows 9.X, the system and method of the present disclosure may be implemented in a manner similar to that described under DOS using Windows 9.X callback functions, with a device driver for low-level calls, such as, for example, interrupts and memory access.

A hook is a mechanism by which a function can intercept events (messages, mouse actions, keystrokes) before they reach an application. The function can act on events and, in some cases, modify or discard them.

According to the present system and method, file system hooks may be scanned in order to detect malicious code that hooks on to the file system and monitors the input/output. In a similar manner, the system and method of the present disclosure may scan device drivers.

Further, under Windows 9.X, the system and method of the present disclosure may perform a scan of input/output function addresses, such as, for example, CreateFile, OpenFile, etc, using, for example, a read memory block callback function.

For computers using the Windows NT operating system, the system and method of the present disclosure scan the DOS platform memory locations as noted above. Memory blocks belonging to Windows processes may be scanned using a read memory block callback. File system books may be scanned in order to detect malicious code that hooks on to the file system and monitors the input/output. In a similar manner, the system and method of the present disclosure may scan device drivers.

Further, under Windows NT, the system and method of the present disclosure may perform a scan of input/output function addresses, such as, for example, CreateFile, OpenFile, etc, using, for example, a read memory block callback function.

For computers using the Windows 2000 operating system, the system and method of the present disclosure may scan the above described DOS platform memory locations. Memory blocks belonging to Windows processes may be scanned using a read memory block callback function. File system hooks may be scanned in order to detect malicious code that hooks on to the file system and monitors the input/output. In a similar manner, the system and method of the present disclosure may scan device drivers.

Further, under Windows 2000, the system and method of the present disclosure may perform a scan of input/output function addresses, such as, for example, CreateFile, OpenFile, etc, using, for example, a read memory block callback function.

While several examples of operating systems and the scanning performed on those operating systems according to the system and method of the present invention have been described above, it is noted that the system and method of the present disclosure are not limited to application with these operating system. The system and method of the present disclosure may be utilized with any operating system.

Figure 5:
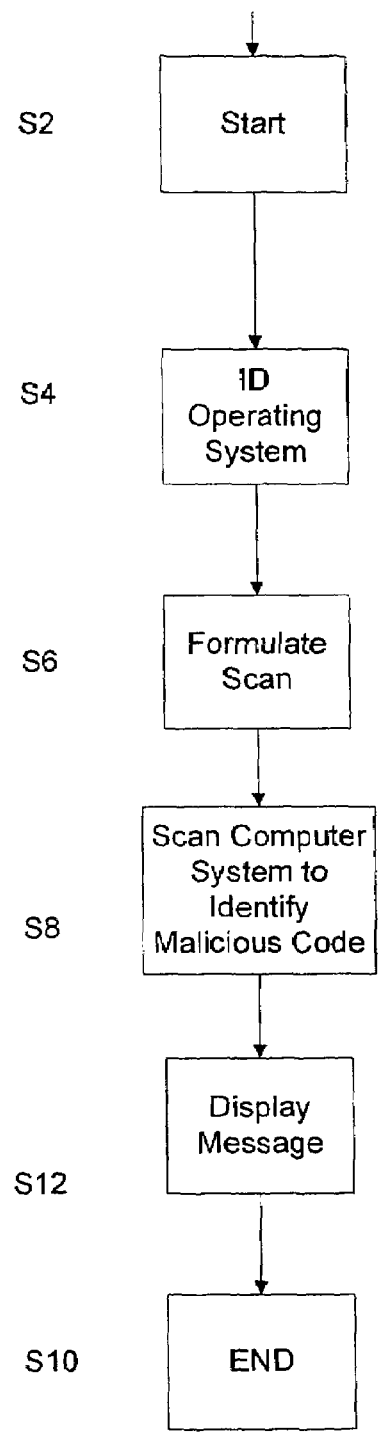
FIG. 5 shows a flowchart of a method for detecting and removing malicious code in a computer system according to an embodiment of the present disclosure.

FIG. 5 illustrates another embodiment of a method according to the present disclosure. Steps S2 through S8 are substantially the same as described with respect to FIG. 2. However, according to this embodiment, if malicious code has been detected or identified (Step S8), the system and method can display a warning to a user indicating that malicious code has been detected and/or identifying the malicious code. (Step S12).

Figure 6:
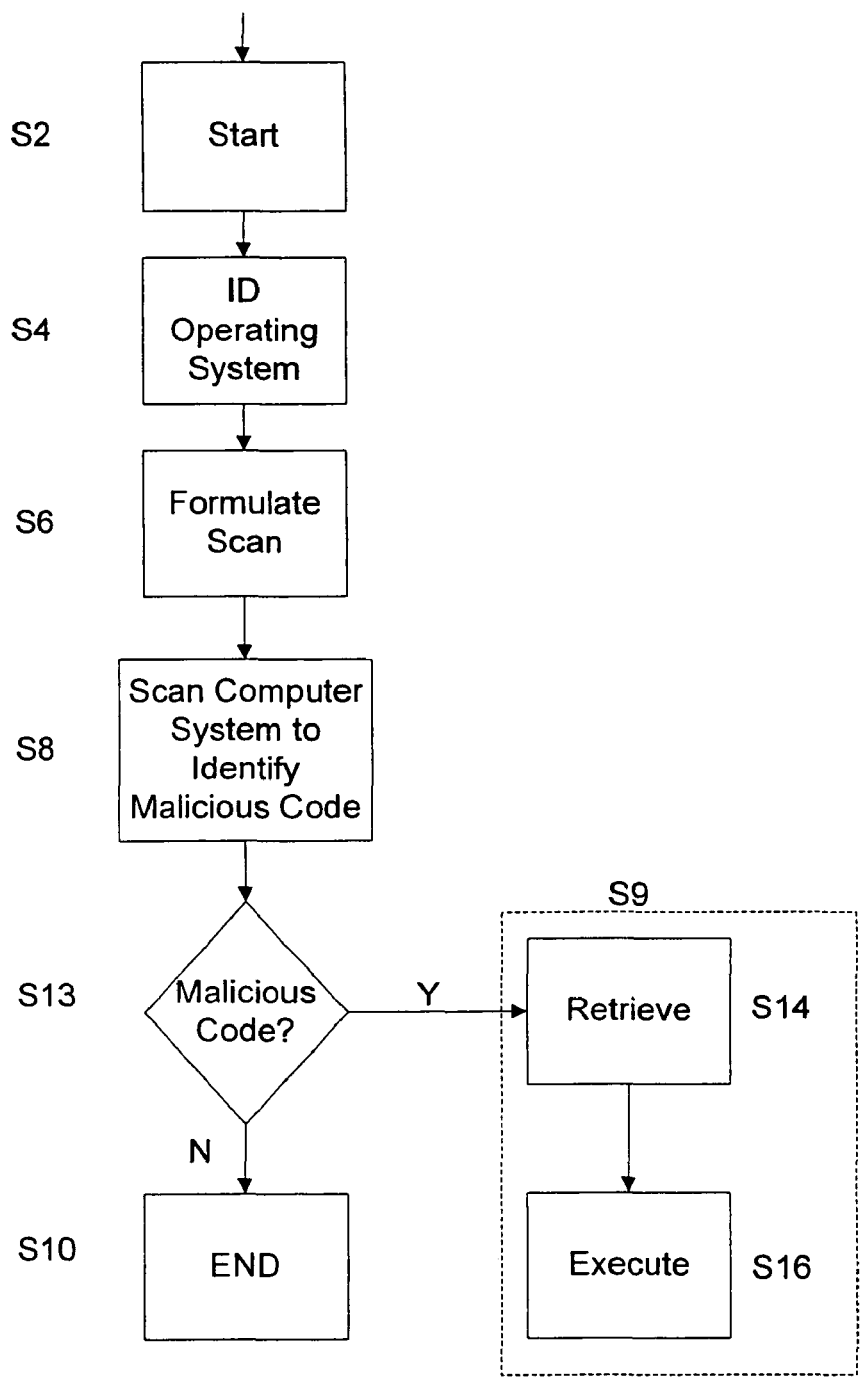
FIG. 6 shows a flowchart of a method for detecting and removing malicious code in a computer system according to an embodiment of the present disclosure.

FIG. 6 illustrates another embodiment of another method according to the present disclosure. Steps S2 through S8 of FIG. 6 are substantially the same as described above with reference to FIG. 2 and therefore will not be discussed in further detail. In the embodiment of FIG. 6, if malicious code has been identified (Yes at Step S13), the system and method of the present disclosure may retrieve one or more restoration data files specific to the malicious code detected (Step S14) and which may include commands for restoring the computer system to the state as it existed prior to modification by the malicious code and execute the commands for restoring the computer system (Step S16). Steps S14 and S16 may be implemented in the code removing step S9 of FIG. 2 if desired. While FIG. 5 and FIG. 6 have been discussed separately, it is noted that the warning indicating that malicious code is present and/or identifying the malicious code that has been detected may also allow the user to select an option to send a command to retrieve one or more restoration files specific to the malicious code detected. The restoration files may include commands for restoring the computer system to the state as it existed prior to modification by the malicious code and execute the commands for restoring the computer system. Alternatively, the steps of retrieving and executing may be performed automatically after malicious code is detected while the message displayed to the user merely notifies the user that malicious code was detected.

Figure 7:
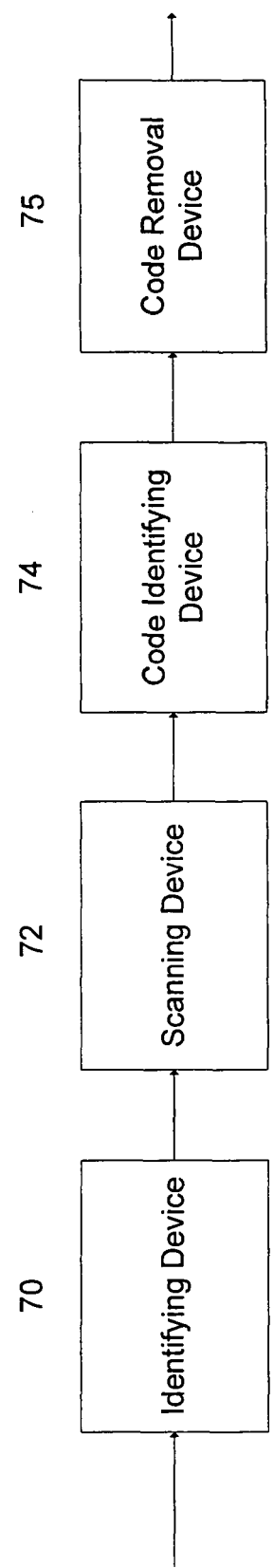
FIG. 7 shows a block diagram of a system for detecting and removing malicious code in a computer system according to an embodiment of the present disclosure.

FIG. 7 illustrates a system for detecting and removing malicious code in a computer system according to an embodiment of the present disclosure. An identifying device 70 identifies an operating system of the computer system. A scanning device 72 scans the computer system in accordance with the operating system identified by the identifying device 70. A code identification device 74 identifies malicious code in the computer system scanned by the scanning device 72. A code removing device 75 may remove the malicious code from the computer system. The system may also include a display device 76 which displays a message to the user of the system identifying the malicious code identified by the malicious code identifying device 74 to the user. (See FIG. 8) The system may additionally include a retrieving device 77 adapted to retrieve from a data file, information relating to the malicious code including at least one command for restoring the computer system to a state that existed prior to modification by the malicious code and an executing device 78 executing the at least one command for restoring the computer system to substantially the same state as it existed prior to modification by the malicious code (see FIG. 9). The retrieving device 77 and the executing device 78 may be included in the code removing device as illustrated in FIG. 9.

Figure 8:
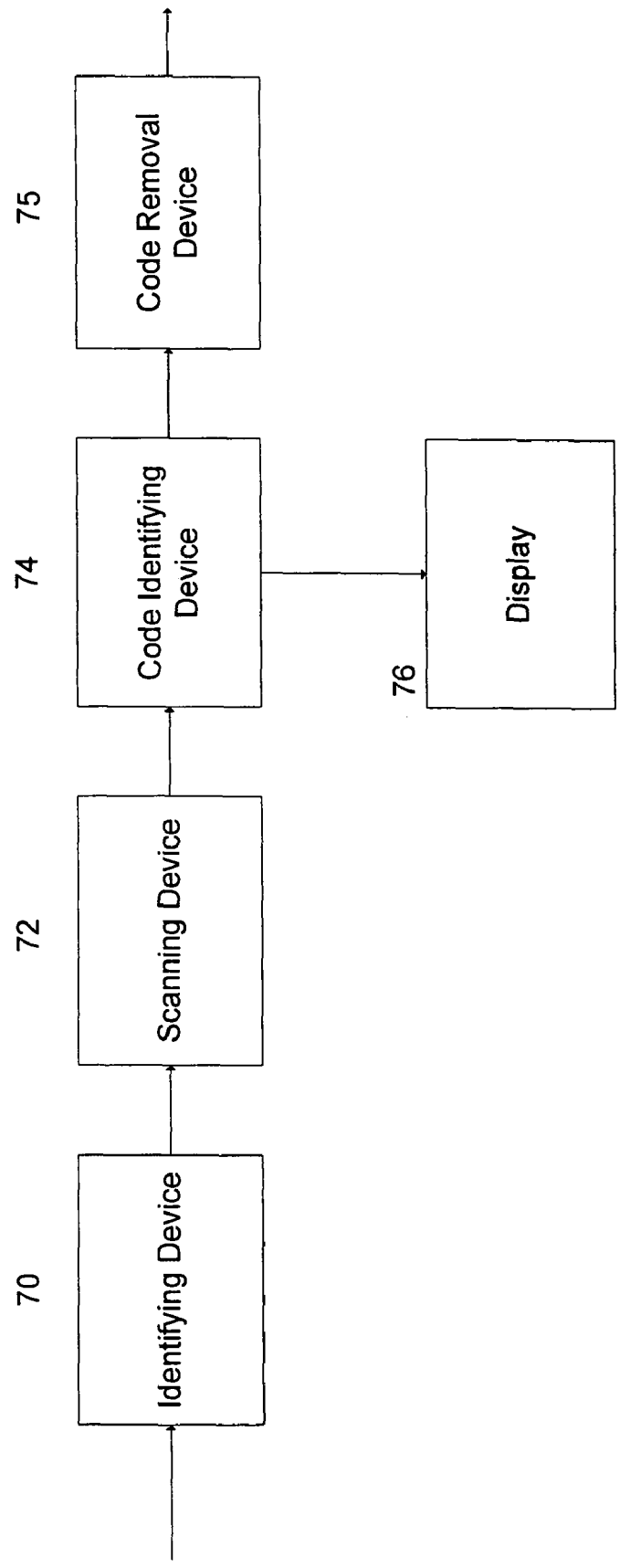
FIG. 8 shows a block diagram of a system for detecting and removing malicious code in a computer system according to an embodiment of the present disclosure.
Figure 9:
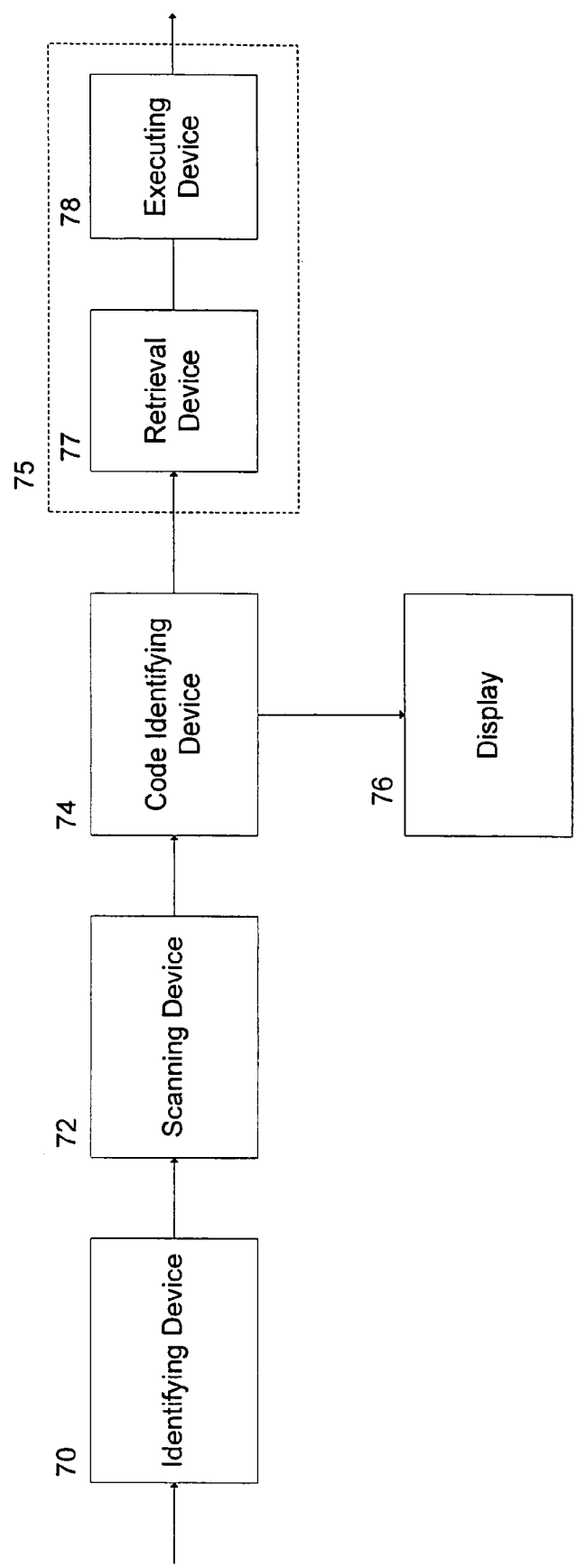
FIG. 9 shows a block diagram of a system for detecting and removing malicious code in a computer system according to an embodiment of the present disclosure.

The systems of the present disclosure depicting FIGS. 7-9 may substantially utilize the methods described above with respect to FIGS. 1-6 above and thus will not be described in further detail. The system and method of the present disclosure may read variable length memory blocks and may write, to a specified location, a variable number of bytes.

The present disclosure may be conveniently implemented using one or more conventional general purpose digital computers and/or servers programmed according to the teachings of the present disclosure. Appropriate software coding can readily be prepared based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein. For example, additional variations may be apparent to one of ordinary skill in the art from reading commonly-owned provisional application Ser. No. 60/335,648, which is incorporated herein by reference.

What is claimed is:

1. A method for detecting and removing malicious code from a computer system, comprising:
   determining an operating system of the computer system;
   determining a memory scanning pattern specific to the determined operating system for scanning a memory of the computer system for malicious code;
   scanning the computer system for malicious code according to the memory scanning pattern.

2. The method of claim 1, further comprising:
   removing detected malicious code from the computer system.

3. The method of claim 1, further comprising displaying a message to a user identifying detected malicious code.

4. The method of claim 1, further comprising displaying a message to a user indicating the presence of malicious code in the computer system.

5. The method of claim 2, wherein the removing step further comprises retrieving from a data file, information relating to the detected malicious code, including at least one command for restoring the computer system to a state that existed prior to modification by the malicious code and executing the at least one command for restoring the computer system to substantially a state that existed prior to modification by the malicious code.

6. The method of claim 5, wherein the data file is retrieved based on a command from the user.

7. The method of claim 1, wherein the scanning step further comprises scanning a memory of the computer system in accordance with a memory layout associated with the determined operating system.

8. The method of claim 1, wherein the scanning step comprises dividing memory locations of the computer system into a plurality of memory blocks and scanning predetermined memory blocks in accordance with the determined operating system.

9. The method of claim 6, wherein selected memory blocks are not scanned in accordance with the determined operating system.

10. A storage medium including computer executable code for detecting and removing malicious code from a computer system, comprising:
   code for determining an operating system of the computer system;
   code for determining a memory scanning pattern specific to the determined operating system for scanning a memory of the computer system for malicious code;
   code for scanning the computer system for malicious code according to the memory scanning pattern; and
   code for detecting the malicious code.

11. The storage medium of claim 10, further comprising:
   code for removing the malicious code from the computer system.

12. The storage medium of claim 10, further comprising code for displaying a message to a user identifying the malicious code.

13. The storage medium of claim 10, further comprising code for displaying a message to a user indicating that the malicious code is present on the computer system.

14. The storage medium of claim 11, wherein the code for removing the malicious code further comprises:
   code for retrieving from a data file, information relating to the malicious code including at least one command for restoring the computer system to substantially a state that existed prior to modification by the malicious code and executing the at least one command for restoring the computer system to substantially a state that existed prior to modification by the malicious code after the message identifying the malicious code is displayed to the user.

15. The storage medium of claim 14, wherein the code for retrieving is implemented in response to a command from a user.

16. The storage medium of claim 10, wherein the code for scanning further comprises code for scanning a memory of the computer system according to a memory layout associated with the determined operating system.

17. The storage medium of claim 10, wherein the code for scanning further comprises code for dividing memory locations of the computer system into a plurality of memory blocks and scanning predetermined memory blocks in accordance with the determined operating system.

18. The storage medium of claim 17, wherein the code for scanning further comprises code for determining selected memory blocks that are not scanned in accordance with the determined operating system.

19. Software stored on a tangible computer-readable storage media for detecting and removing malicious code from a computer system, the computer system operable when executing the software to perform the following steps, comprising:
   determining an operating system of the computer system;
   determining a memory scanning pattern specific to the determined operating system for scanning a memory of the computer system for malicious code;
   scanning the computer system for malicious code according to the memory scanning pattern; and
   detecting the malicious code.

20. The software of claim 19, further comprising the steps of:
   removing the malicious code.

21. The software of claim 19, further comprising the steps of displaying a message to a user identifying the malicious code.

22. The software of claim 19, further comprising the steps of displaying a message indicating to a user that malicious code is present in the computer system.

23. The software of claim 20, wherein removing the malicious code further comprises:
   retrieving from a data file, information relating to the malicious code including at least one command for restoring the computer system to a state that existed prior to modification by the malicious code and executing the at least one command for restoring the computer system to substantially a state that existed prior to modification by the malicious code.

24. The software of claim 23, wherein the data file is retrieved in response to a command from a user.

25. The software of claim 19, further comprising the steps of scanning a memory of the computer system in accordance with a memory layout associated with the determined operating system.

26. The software of claim 19, wherein the scanning further comprises dividing memory locations of the computer system into a plurality of memory blocks and scanning predetermined memory blocks in accordance with the determined operating system.

27. The software of claim 26, wherein the scanning further includes determining selected memory blocks that are not scanned, based on the determined operating system.

28. A system for detecting and removing malicious code from a computer system, comprising:
   an identifying device adapted to determine an operating system of the computer system;
   a determining device adapted to determine a memory scanning pattern specific to the determined operating system for scanning a memory of the computer system for malicious code;
   a scanning device adapted to scan the computer system for malicious code according to the memory scanning pattern; and
   a code identifying device adapted to detect the malicious code.

29. The system of claim 28, wherein the memory scanning pattern identifies one or more portions of the memory that are unused by the determined operating system and indicates that the unused portions are to be left unscanned.

30. The system of claim 28, wherein the memory scanning pattern optimizes scanning the computer system for malicious code by identifying portions of the memory that are unsusceptible to malicious code ("unsusceptible memory portions") due to treatment of the unsusceptible memory portions by the determined operating system and indicates that the unsusceptible memory portions are to be left unscanned.

31. The system of claim 28, wherein the scanning device is adapted to scan the computer system for malicious code by searching for viral signatures in the memory.

32. The system of claim 29, wherein the code removal device further comprises:
- a retrieving device adapted to retrieve one or more restoration data files specific to a detected malicious code including at least one command for restoring the computer system to a state that existed prior to modification by the detected malicious code; and
- an execution device adapted to execute the at least one command for restoring the computer system to substantially the same state as it existed prior to modification by the detected malicious code.

33. The system of claim 28, wherein the memory scanning pattern identifies a memory layout specific to the determined operating system and uses the memory layout to identify portions of the memory that are unsusceptible to malicious code.

34. The system of claim 28, wherein the scanning device further scans a memory of the computer system in accordance with a memory layout associated with the determined operating system.

35. The system of claim 28, wherein the scanning device divides memory locations of the computer system into a plurality of memory blocks and scans predetermined memory blocks in accordance with the determined operating system.

36. The system of claim 35, wherein the scanning device does not scan selected memory blocks based on the determined operating system.

* * * * *